United States Patent
Park

(10) Patent No.: US 8,314,762 B2
(45) Date of Patent: Nov. 20, 2012

(54) LIQUID CRYSTAL DISPLAY DEVICE

(75) Inventor: June Ho Park, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 637 days.

(21) Appl. No.: 12/252,735

(22) Filed: Oct. 16, 2008

(65) Prior Publication Data

US 2009/0135125 A1    May 28, 2009

(30) Foreign Application Priority Data

Nov. 23, 2007 (KR) .................. 10-2007-0120233

(51) Int. Cl.
*G09G 3/36* (2006.01)

(52) U.S. Cl. .................. 345/92; 345/87; 345/103

(58) Field of Classification Search .......... 345/87–104
See application file for complete search history.

(56) References Cited

U.S. PATENT DOCUMENTS

| | | | | |
|---|---|---|---|---|
| 5,886,762 | A * | 3/1999 | Lee et al. ............ | 349/141 |
| 7,227,609 | B2 * | 6/2007 | Lee .................... | 349/146 |
| 7,599,035 | B2 * | 10/2009 | Park et al. .......... | 349/141 |
| 2003/0090448 | A1 * | 5/2003 | Tsumura et al. ... | 345/87 |
| 2004/0090564 | A1 * | 5/2004 | Lee .................... | 349/43 |
| 2005/0099569 | A1 * | 5/2005 | Moon et al. ........ | 349/141 |
| 2005/0140903 | A1 * | 6/2005 | Park et al. .......... | 349/141 |
| 2005/0253978 | A1 * | 11/2005 | Chae et al. ......... | 349/43 |
| 2006/0256248 | A1 * | 11/2006 | Baek et al. ......... | 349/42 |
| 2006/0285048 | A1 * | 12/2006 | Ohno ................. | 349/139 |
| 2007/0008242 | A1 * | 1/2007 | Mori et al. ......... | 345/60 |
| 2007/0139331 | A1 * | 6/2007 | You .................... | 345/90 |
| 2008/0007504 | A1 * | 1/2008 | Kawaura et al. ... | 345/89 |
| 2008/0074599 | A1 * | 3/2008 | Yamaguchi et al. | 349/132 |
| 2008/0284967 | A1 * | 11/2008 | Oh et al. ............ | 349/144 |

FOREIGN PATENT DOCUMENTS

| | | |
|---|---|---|
| JP | 04-360127 | 12/1992 |
| JP | 08-220561 | 8/1996 |
| JP | 10-206869 | 8/1998 |
| JP | 2006-106745 | 4/2006 |

OTHER PUBLICATIONS

Office Action issued in corresponding Japanese Patent Application No. 2008-265126, mailed Sep. 6, 2011.

* cited by examiner

*Primary Examiner* — Amare Mengistu
*Assistant Examiner* — Dmitriy Bolotin
(74) *Attorney, Agent, or Firm* — Brinks Hofer Gilson & Lione

(57) ABSTRACT

A LCD device adapted to reduce data lines and prevent the deterioration of picture quality characteristics. The LCD device includes: a substrate defined into a plurality of pixels; a plurality of data lines arranged in a first direction on the substrate to divide the pixels in twos; a plurality of gate lines arranged on the substrate in a second direction crossing the first direction; thin film transistors each disposed on the pixels to be electrically connected to the respective gate lines and data lines; pixel electrodes each disposed on the pixels, to be electrically connected to the respective thin film transistors; and compensation electrodes each overlapped with the pixel electrodes adjacent to the respective gate lines in the center of an insulation film, to reduce parasitic capacitances between the pixel electrodes and the gate lines.

6 Claims, 4 Drawing Sheets

LIQUID CRYSTAL DISPLAY DEVICE

RELATED APPLICATIONS

This application claims priority under 35 U.S.C. 119 to Korean Patent Application No. 10-2007-120233, filed on Nov. 23, 2007, which is hereby incorporated by reference in its entirety.

BACKGROUND

1. Field of the Disclosure

This disclosure relates to a liquid crystal display device, and more particularly to a liquid crystal display device adapted to ensure the quality of picture and to reduce its manufacturing costs.

2. Description of the Related Art

Nowadays, liquid crystal display (LCD) devices have been highlighted as one of the next-generation high-tech display devices, because of their features such as lower consumption power, superior portability, techno-intensiveness, high added value, etc. The LCD devices are display devices employing the optical anisotropy of liquid crystal. Such LCD devices apply an electric field to the liquid crystal to control light transmittance of the liquid crystal, thereby displaying a variety of pictures (or images).

FIG. 1 is a schematic block diagram showing an LCD device of related art. Referring to FIG. 1, the LCD device includes a liquid crystal panel 10 displaying pictures, gate driver 20 applying scan signals to the liquid crystal panel 10, and a data driver 30 applying pixel voltages to the liquid crystal panel 10.

The liquid crystal panel 10 includes first and second substrates (not shown), and a liquid crystal layer (not shown) interposed between the first and second substrates. One of the first and second substrates (hereinafter, first substrate) includes plural pixels P on each region defined by crossing plural gate lines 21 and plural data lines 31. The gate lines 21 are electrically connected to the gate driver 20. The data lines 31 are electrically connected to the data driver 30.

The gate driver 20 sequentially outputs the scan signals to the gate lines 21. The data driver 30 applies the pixel voltages (or data voltage signal) to the pixels P, which are electrically connected to a selected gate line 21 by the scan signal, during an interval of the scan signal, i.e., the period in which the scan signal is being applied to the selected gate line 21.

The gate line number and the data line number depend on the definition of LCD device. For example, if the LCD device has the definition of 1024×768, the data lines 31 corresponding to 1024×3 and the gate lines 21 corresponding to 768 are arranged on the first substrate.

The definition of LCD devices has recently has become higher. In accordance therewith, the LCD device should include more data lines and gate lines. Also, the LCD device should require more data drive ICs (Integrated Circuits) and gate drive ICs in order to provide the data and gate drivers with output channels corresponding to the data and gate line numbers. As a result, the LCD device may have increased manufacturing costs along with the increase of its definition.

Moreover, the data lines 31, which are formed to vertically extending on the LCD device, are arranged more numerously and densely than the gate lines 21, in the LCD device. Accordingly, it is more difficult to secure a sufficient distance between the data lines 31 of the LCD device, and furthermore can causes mis-operation.

BRIEF SUMMARY

An LCD device includes: a substrate defined into a plurality of pixels; a plurality of data lines arranged in a first direction on the substrate to divide the pixels two by two; a plurality of gate lines arranged on the substrate in a second direction crossing the first direction; thin film transistors each disposed on the pixels and electrically connected to the respective gate lines and data lines; pixel electrodes each disposed on the pixels and electrically connected to the respective thin film transistors; and compensation electrodes each overlapped with the pixel electrodes adjacent to the respective gate lines in the center of an insulation film, to reduce parasitic capacitances between the pixel electrodes and the gate lines.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated in and constitute a part of this application, illustrate embodiment(s) of the invention and together with the description serve to explain the disclosure. In the drawings.

DETAILED DESCRIPTION OF THE DRAWINGS AND THE PRESENTLY PREFERRED EMBODIMENTS

Figure 1:
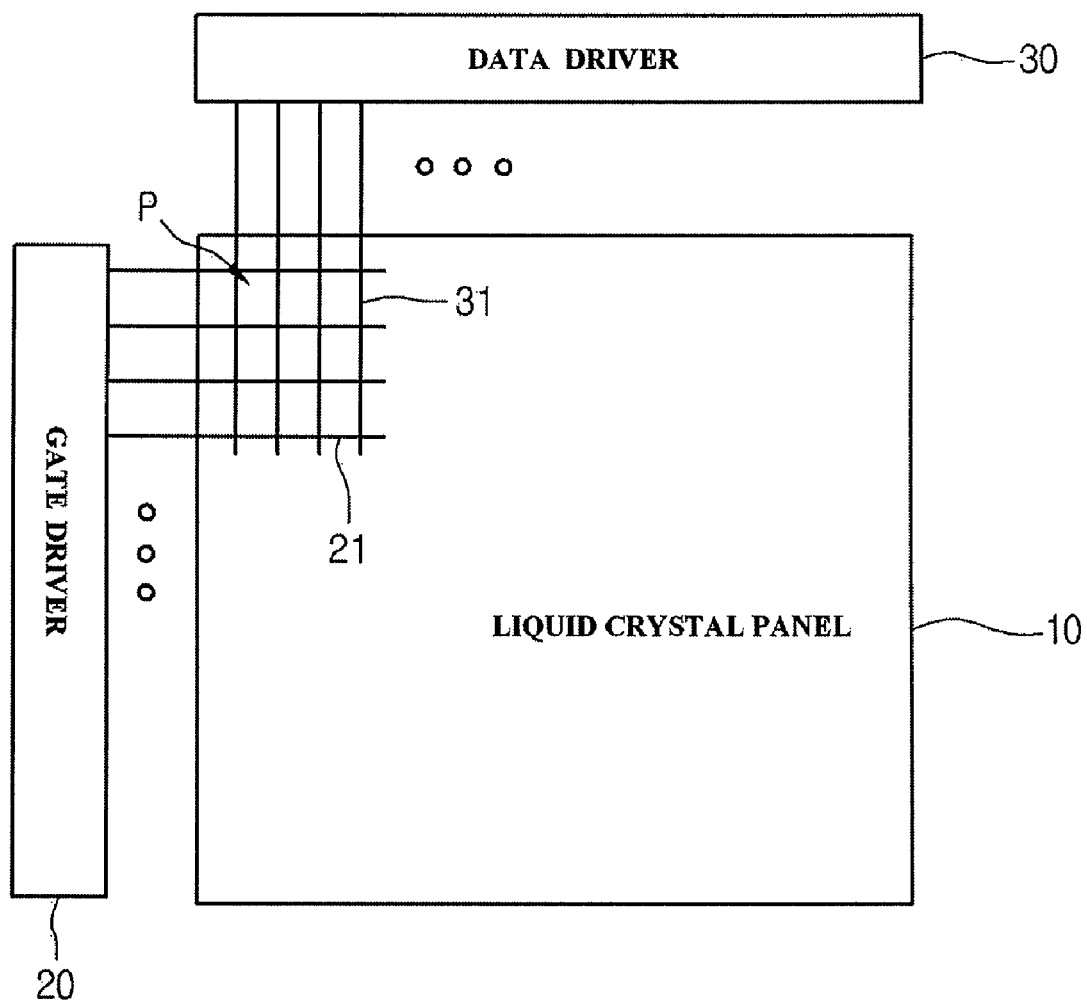
FIG. 1 is a schematic block diagram showing an LCD device of related art.

Reference will now be made in detail to the embodiments of the present disclosure, examples of which are illustrated in the accompanying drawings. These embodiments introduced hereinafter are provided as examples in order to convey their spirits to the ordinary skilled person in the art. Therefore, these embodiments might be embodied in a different shape, so is not limited to these embodiments described here. Also, the size and thickness of the device might be expressed to be exaggerated for the sake of convenience in the drawings. Wherever possible, the same reference numbers will be used throughout this disclosure including the drawings to refer to the same or like parts.

Figure 2A:
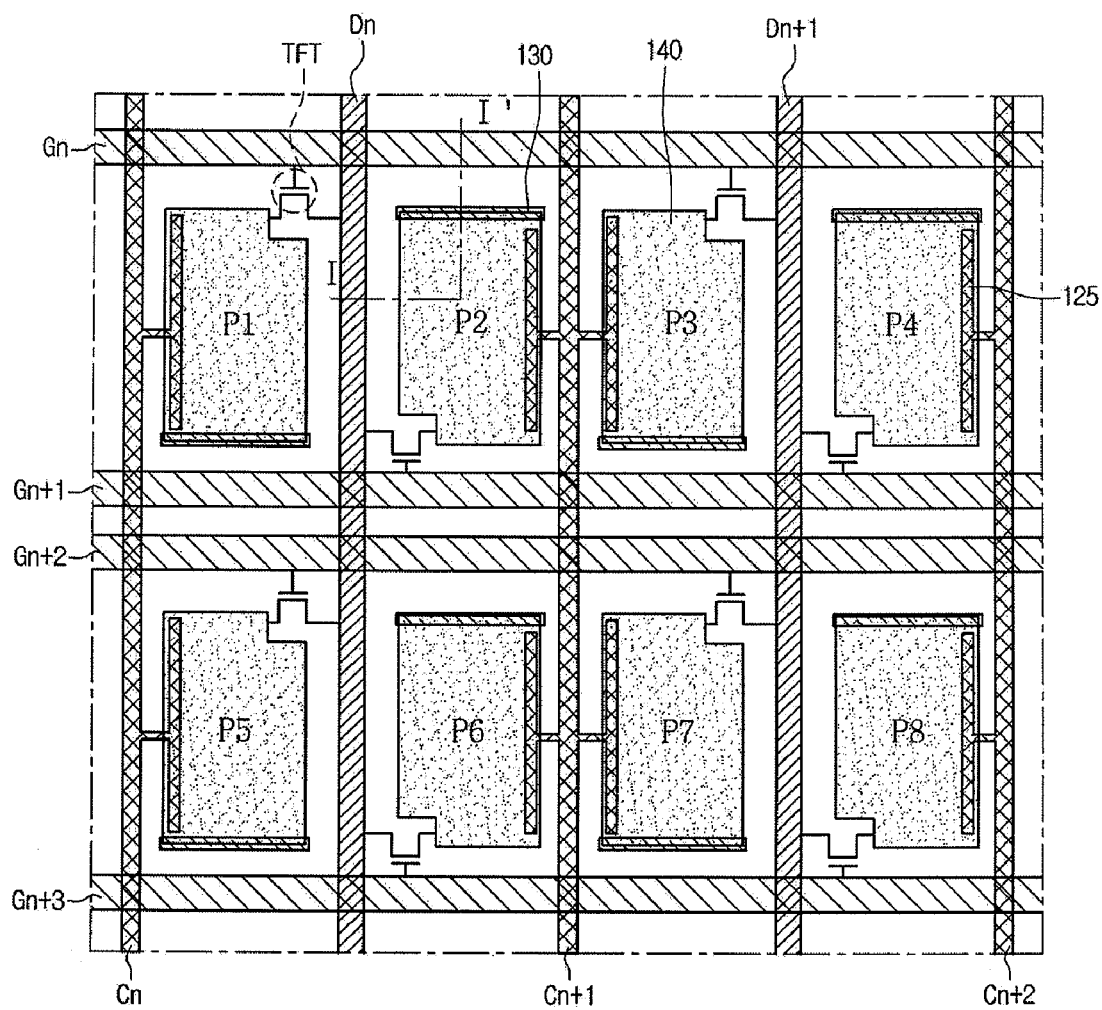
FIG. 2A is a plan view showing some pixels in an LCD device according to a first embodiment of the present disclosure.
Figure 2B:
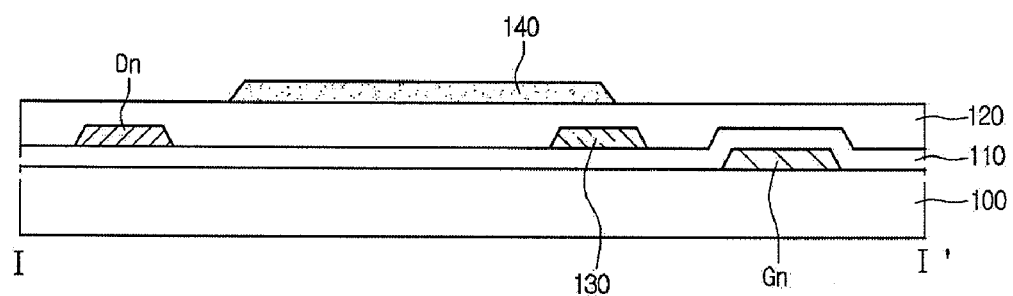
FIG. 2B is a cross sectional view showing a pixel taken along the line I-I' in FIG. 2A.

FIGS. 2A and 2B are views explaining an LCD device according to a first embodiment of the present disclosure. FIG. 2A is a plan view showing some pixels in the LCD device according to the first embodiment of the present disclosure. FIG. 2B is a cross sectional view showing a pixel taken along the line I-I' in FIG. 2A.

Referring to FIGS. 2A and 2B, the LCD device includes a liquid crystal panel (not shown), and a data driver (not shown) and gate driver (not shown) which apply external electric signals to the liquid crystal panel. The liquid crystal panel includes plural pixels P1 to P8 for displaying a picture. Also, the liquid crystal panel includes a first substrate 100, a second substrate (not shown), and a liquid crystal interposed between the first and second substrates.

On the first substrate 100, plural data lines Dn and Dn+1 are arranged in a first direction. The data lines Dn and Dn+1 divide the plural pixels P8 by at least two. For example, a first data line Dn of the plural data lines Dn and Dn+1 may apply a pixel voltage (or data voltage signal) to the two pixels which are arranged by left and right sides, respectively, i.e., first and second pixels P1 and P2. Hereby, the LCD device, according to the first embodiment of the present disclosure, reduces the data lines Dn and Dn+1 by half of data line number included in an LCD device which has the same definition.

A plurality of gate lines Gn, Gn+1, Gn+2, and Gn+3 are arranged on the first substrate 100 in a second direction crossing the first direction. Such gate lines Gn, Gn+1, Gn+2, and Gn+3 can define the plural pixels P1 to P8 by crossing the data lines Dn and Dn+1. Actually, in two regions which are defined by means of the first and second data lines Dn and Dn+1 and the first and second gate lines Gn and Gn+1, two pixels, including the second and third pixels P2 and P3, are disposed. In other words, the second and third pixels P2 and P3 are arranged between the first and second gate lines Gn and Gn+1.

Each of the pixels P1 to P8 includes a thin film transistor TFT and a pixel electrode 140 which is electrically connected to the thin film transistor TFT, arranged therein. The thin film transistor TFT includes a gate electrode branched from the corresponding gate line Gn, Gn+1, Gn+2, or Gn+3, a semiconductor pattern overlapped with the gate electrode in the center of a gate insulation film, a source electrode disposed on the semiconductor pattern and electrically connected to the data line Dn or Dn+1, and a drain electrode disposed on the semiconductor pattern and separated from the source electrode.

The pixels on the same row (or the same line), for example, the first to fourth pixels P1 to P4, are alternatively connected to the first and second gate lines Gn and Gn+1 through their thin film transistor TFT. Hereby, the pixels on the same row, which include first to fourth pixels P1 to P4, are sequentially selected in halves by sequential scan signals applied from the alternatively connected gate lines Gn and Gn+1 therewith. Then, the first and second lines Dn and Dn+1 repeatedly apply the pixel voltages to the pixels on the same row, including the first to fourth pixels P1 to P4. Accordingly, the pixels on the same row, including the first and fourth pixels P1 to P4, in halves, sequentially receive the respective pixel voltages from the data lines Dn and Dn+1.

However, the pixels on the same line, for example, the first to fourth pixels P1 to P4, can have different kickback voltages ΔVp therefrom. The kickback voltage ΔVp corresponds to a difference voltage between a substantially charged voltage in the pixel P and an applied pixel voltage to the pixel P.

The different kickback voltages ΔVp are caused in that the half of the pixels on the same row each include the connected pixel electrode to the adjacent gate line on their one side and the rest of the pixels each include the connected pixel electrode to the adjacent gate line on their other side. For example, the first and third pixels P1 and P3 of the first to fourth pixels P1 to P4, including the respective pixel electrodes 140 which are connected to the first gate line Gn, have kickback voltages ΔVp different from those of the second and fourth pixels P2 and P4 including the respective pixel electrodes 140 which are connected to the second gate line Gn+1.

More Specifically, the differences between the kickback voltages ΔVp are caused by the differences of parasitic capacitances, which are formed between the first gate line Gn and the pixel electrodes 140 of the first and third pixels G1 and G3, from parasitic capacitances between the second gate line Gn+1 and the pixel electrodes 140 of the second and fourth pixels P2 and P4. Hereby, a flicker noise and a color sense difference between the pixels should occur in the LCD device so that the quality of picture may deteriorate.

In order to lower such a kickback voltage difference, the parasitic capacitance between the gate line Gn, Gn+1, Gn+2, or Gn+3 and the pixel electrode 140 must be reduced. To this end, the distance between the gate line Gn, Gn+1, Gn+2, or Gn+3 and the pixel electrode 140 of each pixel P1~P8 can be extended. However, in this case, an aperture ratio of the pixel P should decrease.

Reducing the parasitic capacitance between the gate line Gn, Gn+1, Gn+2, or Gn+3 and the adjacent pixel electrode 140 thereto without the reduction of the aperture ratio can be implemented by forming a compensation electrode 130 on the pixel electrode 140 adjacent to the gate line Gn, Gn+1, Gn+2, or Gn+3. The compensation electrode 130 is overlapped with the pixel electrode 140 in the center of an insulation film. In other words, the compensation electrode 130 is overlapped with an edge of the pixel electrode 140. Also, the compensation electrode 130 can be floated. Such a compensation film 130 disposed between the gate line Gn, Gn+1, Gn+2, or Gn+3 and the pixel electrode 140 adjacent to the gate line Gn, Gn+1, Gn+2, or Gn+3 shields an electric field generated therebetween (between the gate line and the pixel electrode). Consequently, the compensation electrode 130 has a function that the parasitic capacitance between the gate line Gn, Gn+1, Gn+2, or Gn+3 and the adjacent pixel electrode 140 thereto is less or not. Moreover, the compensation electrode 130 can prevent the formation of the parasitic capacitor between the pixel electrodes 140 which are adjacent to each other in the center of the gate line Gn, Gn+1, Gn+2 or Gn+3.

The compensation electrode 130 can be disposed in the same layer as one of the gate lines Gn, Gn+1, Gn+2, and Gn+3 and the data lines Dn and Dn+1. If the compensation electrode 130 is disposed in the same layer as the gate lines Gn, Gn+1, Gn+2, and Gn+3, the insulation film should include the gate insulation film 110 and a passivation layer 120. In other words, the compensation electrode 130 can be disposed on the first substrate 100. Hereby, the compensation electrode 130 may be formed of the same material as the gate lines Gn, Gn+1, Gn+2, and Gn+3.

Alternatively, the insulation film may include only the passivation layer 120 when the compensation electrode 130 is disposed in the same layer as the data lines Dn and Dn+1, as shown in FIG. 2B. In other words, the compensation electrode 130 can be disposed on the gate insulation film 110. Hereby, the compensation electrode 130 may be formed of the same material as the data lines Dn and Dn+1.

In this matter, the compensation electrode 130 can be designed to be provided through a process of forming one of the gate lines Gn, Gn+1, Gn+2, and Gn+3 and the data lines Dn and Dn+1. Accordingly, the compensation electrode 130 does not require an additionally independent process of forming it.

Also, common lines Cn, Cn+1, and Cn+2 parallel with the data lines Dn and Dn+1 can be additionally disposed in between the times of the two pixels divided by the data lines Dn and Dn+1, respectively. The common lines Cn, Cn+1, and Cn+2 may be arranged in the same layer as the data lines Dn and Dn+1, i.e., on the gate insulation film 110.

Such common lines Cn, Cn+1, and Cn+2 can include storage electrode portions 125 which overlap with the pixel electrodes 140 in the center of the passivation layer 120 and form storage capacitors, respectively.

On the other hand, in an inner surface of second substrate not shown in drawings, color filter patterns filtering specific wave length lights and a common electrode forming an electric field for driving liquid crystal can be disposed.

Therefore, the LCD device according to the first embodiment of the present disclosure described above can reduce one half the data lines in comparison with the related art, and cut down its manufacturing costs.

Moreover, the LCD device according to the first embodiment of the present disclosure can include the compensation electrode, thereby reducing the parasitic capacitance between the gate line and the pixel electrode. Accordingly, the LCD device may have an uniform kickback voltage ΔVp in all pixels and can prevent a deterioration of picture quality.

In such LCD device, according to the first embodiment of the present disclosure, the thin film transistors each included in the pixels are arranged in jig-jag formation, but is not limited to this. In other words, the thin film transistors can be arranged in a variety of formations.

Figure 3A:
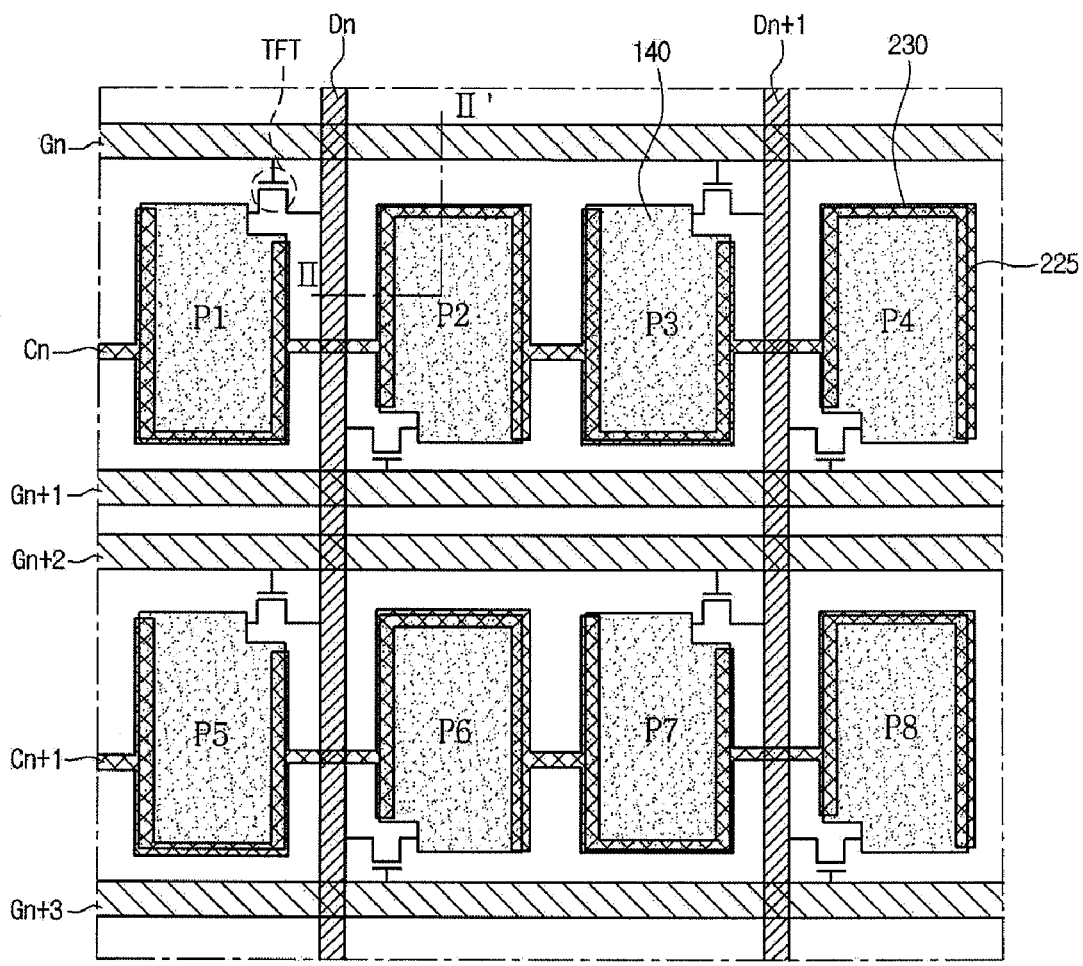
FIG. 3A is a plan view showing some pixels in an LCD device according to a second embodiment of the present disclosure.
Figure 3B:
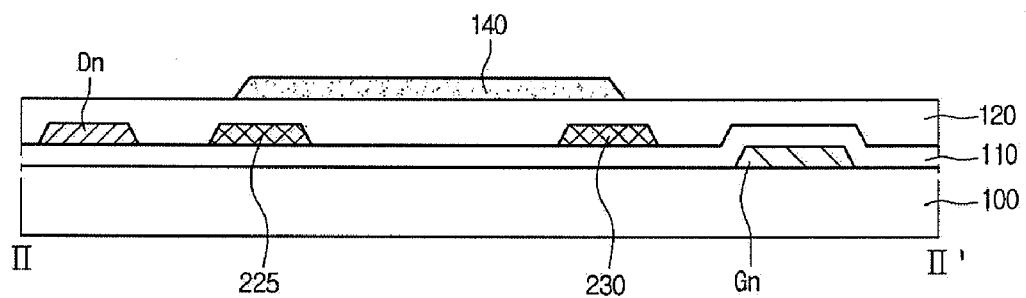
FIG. 3B is a cross sectional view showing a pixel taken along the line II-II' in FIG. 3A.

FIGS. 3A and 3B are views explaining an LCD device according to a second embodiment of the present disclosure. FIG. 3A is a plan view showing some pixels in the LCD device according to the second embodiment of the present disclosure. FIG. 3B is a cross sectional view showing a pixel taken along the line II-II' in FIG. 3A. The LCD device according to the second embodiment has the same configuration as that of the first embodiment described above, with the exception of compensation electrode and common lines. Accordingly, the description of the first embodiment to be repeated in the second embodiment of the present disclosure will be omitted. Also, the LCD device according to the second embodiment of the present disclosure will refer to the same reference numbers for the same configuration as that according to the first embodiment.

Referring to FIGS. 3A and 3B, the LCD device includes a first substrate 100 in which plural pixels P1 to P8 define thereon. The LCD device can reduce one half of data lines in comparison with the related art LCD device of the same definition, since the first substrate 100 includes plural data lines which divide the pixels two by two.

The LCD device includes compensation electrodes 230 for reducing parasitic capacitances between gate lines Gn, Gn+1, Gn+2, and Gn+3 and pixel electrodes 140. In accordance therewith, the LCD device can maintain an uniform kickback voltage ΔVp in all pixels and can prevent a deterioration of picture quality.

Also, the LCD device includes common lines Cn and Cn+1 parallel with the gate lines Gn, Gn+1, Gn+2, and Gn+3. The common lines Cn and Cn+1 can be formed of the same material and on the same layer as the gate lines Gn, Gn+1, Gn+2, and Gn+3. Each of the common lines include storage electrode portions 225 which overlap with the pixel electrodes 140 in the center of an insulation film, for example a double insulation film of gate insulation film 110 and passivation layer 120, and form storage capacitors, respectively. The storage electrode portion 225 can be disposed to overlap with edges of the respective pixel electrodes 140. Also, the storage electrode portions 225 can be in one unitary body with the respective compensation electrodes 230. Hereby, the compensation electrodes 230 also can be in one unitary body with the respective common lines Cn and Cn+1. Consequently, the compensation electrodes 230 reduce the parasitic capacitances between the respective gate lines Gn, Gn+1, Gn+2, and Gn+3 and the respective pixel electrodes 140 and provide storage capacitors to the respective pixels P1 to P8.

In this manner, the LCD device according to the second embodiment of the present disclosure forms the compensation electrodes 230 in one unitary body with the respective common lines Cn and Cn+1. Accordingly, the LCD device can perform the functions of reducing the capacitances between the pixel electrodes 140 and the gate line Gn, Gn+1, Gn+2, or Gn+3, and of charging pixel voltages to the respective pixels P1 to P8.

Figure 4A:
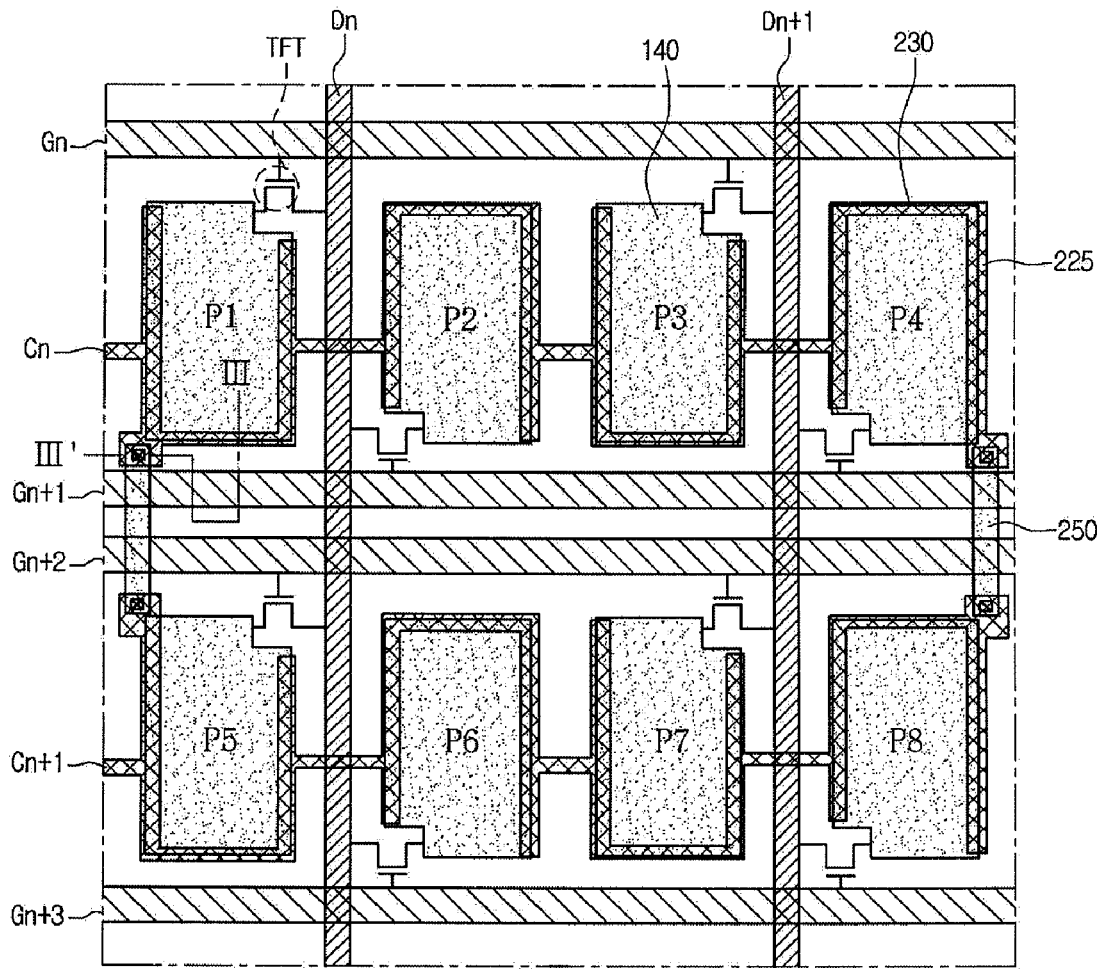
FIG. 4A is a plan view showing some pixels in an LCD device according to a third embodiment of the present disclosure.
Figure 4B:
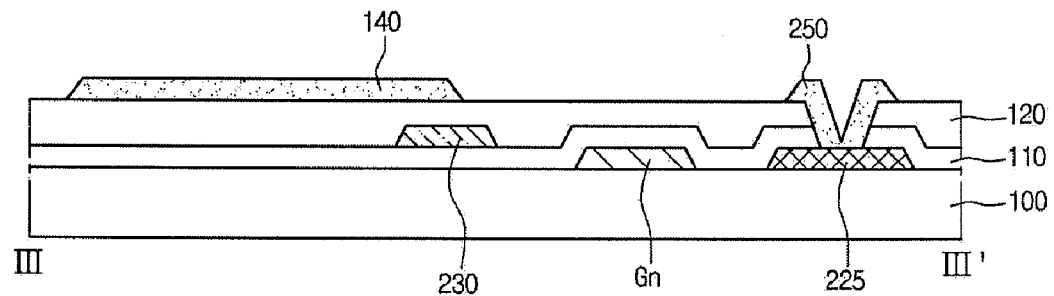
FIG. 4B is a cross sectional view showing a pixel taken along the line III-III' in FIG. 4A.

FIGS. 4A and 4B are views explaining an LCD device according to a third embodiment of the present disclosure. FIG. 4A is a plan view showing some pixels in the LCD device according to the third embodiment of the present disclosure. FIG. 4B is a cross sectional view showing a pixel taken along the line III-III' in FIG. 4A. The LCD device according to the third embodiment has the same configuration as that of the second embodiment described above, with the exception of a connection structure. Accordingly, the description of the second embodiment to be repeated in the third embodiment of the present disclosure will be omitted. Also, the LCD device according to the third embodiment of the present disclosure will refer to the same reference numbers for the same configuration as that according to the second embodiment.

Referring to FIGS. 4A and 4B, the LCD device includes compensation electrodes 230 reducing parasitic capacitances between pixel electrodes 140, and gate lines Gn, Gn+1, Gn+2, and Gn+3. The compensation electrodes 230 can be in one unitary body with respective common lines Cn an Cn+1 which are parallel with the gate lines Gn, Gn+1, Gn+2, and Gn+3.

The common lines Cn and Cn+1 can be arranged to cross pixels P1 to P8. In other words, the common line Cn or Cn+1 may be disposed between two pixels adjacent to each in the center of a data line Dn or Dn+1.

A connection pattern 250 electrically connects the storage electrode portions adjacent to each other in the center of the gate lines Gn, Gn+1, Gn+2, and Gn+3. The common lines Cn and Cn+1 adjacently arranged in the center of the gate lines Gn+1 and Gn+2 also can be connected to each other by means of the connection pattern 250. In other words, the common lines Cn and Cn+1 can form a mesh shape. Accordingly, the resistance of the common line Cn or Cn+1 can be lowered, thereby improving the capacitances of the storage capacitors between the storage electrode portions 225 of the common lines Cn and Cn+1 and the pixel electrodes 140.

Such connection patterns 250 are arranged in the same layer as the pixel electrodes 140 and are formed of the same material as the pixel electrodes 140. Hereby, the connection patterns 250 are designed to be formed through the same processes as the pixel electrodes 140 so that the capacitance of the storage capacitor may improve without additionally providing an independent process.

The LCD device, according to the third embodiment of the present disclosure, is described in that each of the meshes formed by the common lines Cn and Cn+1 include 8 pixels, but are not limited to this. For example, the meshes of the common lines Cn and Cn+1 can include 2 pixels or 4 pixels, respectively.

As described above, the LCD device according to the embodiments of the present disclosure connects pixels in twos to every data line so that the data lines and data drive ICs reduce one half in comparison with those of the related art. Accordingly, the manufacturing cost of an LCD device can be reduced.

Also, the LCD device according to the embodiments of the present disclosure includes compensation electrodes which are overlapped with a part the respective pixel electrodes adjacent to respective gate lines in the center of an insulation film. In accordance therewith, the LCD device can decrease the parasitic capacitances between the gate lines and the pixel electrodes and maintain a uniform kickback voltage $\Delta Vp$ in all the pixels. As a result, the LCD device prevents the deterioration of picture quality.

Moreover, the LCD device according to the embodiments of the present disclosure forms the compensation electrodes in the same layer as one of the gate lines, the data lines, and the common lines. Accordingly, the LCD device does not require an additionally independent process of forming the compensation electrodes.

Furthermore, the LCD device according to the embodiments of the present invention forms the compensation electrodes in one unitary body with the respective common lines and in the shape of meshes. Thus, the resistances of the common lines can be reduced.

It will be apparent to those skilled in the art that various modifications and variations can be made in the present disclosure. Thus, it is intended that the present disclosure cover the modifications and variations of this embodiment provided they come within the scope of the appended claims and their equivalents.

The invention claimed is:

1. A liquid crystal display device comprising:
a substrate defined into a plurality of pixels;
a plurality of data lines arranged in a first direction on the substrate to divide the pixels two by two;
a plurality of gate lines arranged on the substrate in a second direction crossing the first direction;
thin film transistors disposed on the pixels, to be electrically connected to the respective gate lines and data lines;
pixel electrodes disposed on the pixels, to be electrically connected to the respective thin film transistors;
compensation electrodes overlapped with the pixel electrodes adjacent to the respective gate lines in the center of an insulation film, to reduce parasitic capacitances between the pixel electrodes and the gate lines; and
common lines, parallel with the data lines between the pixels which are divided in two by the data lines, each including storage electrode portions which are overlapped with the respective pixel electrodes in the center of the insulation film and form storage capacitors,
wherein the common line is crossed with the plurality of gate lines,
wherein the compensation electrode is disposed parallel to the gate line,
wherein the storage electrode portion is disposed parallel to the data line, and
wherein each of the thin film transistors of the gate lines which are disposed in both sides of pixel electrodes on the same row and each of the thin film transistors is alternately connected to the pixel electrodes,
wherein the common line is disposed between two pixels divided by the data lines and each of storage electrodes protruded from the common line is disposed at a left pixel and a right pixel of two pixels, and
wherein the storage electrodes are parallel with the common line.

2. The liquid crystal display device claimed as claim 1, wherein the compensation electrode is disposed in the same layer as one of the gate line and the data line.

3. The liquid crystal display device claimed as claim 1, wherein the compensation electrodes are formed in one unitary body with the common lines.

4. A liquid crystal display device comprising:
a substrate defined into a plurality of pixels;
a plurality of data lines arranged in a first direction on the substrate to divide the pixels two by two;
a plurality of gate lines arranged on the substrate in a second direction crossing the first direction;
thin film transistors disposed on the pixels, to be electrically connected to the respective gate lines and data lines;
pixel electrodes disposed on the pixels, to be electrically connected to the respective thin film transistors;
compensation electrodes overlapped with the pixel electrodes adjacent to the respective gate lines in the center of an insulation film, to reduce parasitic capacitances between the pixel electrodes and the gate lines;
common lines, parallel with the gate lines, each including storage electrode portions which are overlapped with the respective pixel electrodes in the center of the insulation film and form storage capacitors; and
connection patterns connecting the common lines which are disposed at each of the two pixels opposite each other in the center of the respective gate lines,
wherein the compensation electrodes and the common lines are formed in one unitary body,
wherein the compensation electrode is disposed parallel to the gate line,
wherein the storage electrode portion is disposed parallel to the data line,
wherein each of the thin film transistors of the gate lines which are disposed in both sides of pixel electrodes on the same row and each of the thin film transistors is alternately connected to the pixel electrodes, and
wherein the connection patterns are crossed with two gate lines and the storage electrode portion and the compensation electrode in the two pixels opposite each other are connected by the connection pattern.

5. The liquid crystal display device claimed as claim 4, wherein the common lines are formed in the shape of meshes.

6. The liquid crystal display device claimed as claim 4, wherein the connection patterns are arranged in the same layer as the pixel electrodes.

* * * * *